(12) United States Patent
Mishchik et al.

(10) Patent No.: US 11,883,903 B2
(45) Date of Patent: Jan. 30, 2024

(54) METHOD AND APPLIANCE FOR CUTTING MATERIALS BY MULTI-BEAM FEMTOSECOND LASER

(71) Applicants: AMPLITUDE SYSTEMES, Pessac (FR); CENTRE NATIONAL DE LA RECHERCHE SCIENTIFIQUE, Paris (FR); UNIVERSITE DE BORDEAUX, Bordeaux (FR); ALPHANOV INSTITUT D'OPTIQUE D'AQUITAINE, Talence (FR)

(72) Inventors: Konstantin Mishchik, Bordeaux (FR); John Lopez, Gradignan (FR); Rainer Kling, Cestas (FR); Clémentine Javaux-Leger, Leognan (FR); Guillaume Duchateau, Pessac (FR); Ophélie Dematteo-Caulier, Ychoux (FR)

(73) Assignees: AMPLITUDE, Pessac (FR); CENTRE NATIONAL DE LA RECHERCHE SCIENTIFIQUE, Paris (FR); UNIVERSITE DE BORDEAUX, Bordeaux (FR); ALPHANOV INSTITUT D'OPTIQUE D'AQUITAINE, Talence (FR)

( * ) Notice: Subject to any disclaimer, the term of this patent is extended or adjusted under 35 U.S.C. 154(b) by 1242 days.

(21) Appl. No.: 16/320,585

(22) PCT Filed: Jul. 25, 2017

(86) PCT No.: PCT/FR2017/052072
§ 371 (c)(1),
(2) Date: Jan. 25, 2019

(87) PCT Pub. No.: WO2018/020145
PCT Pub. Date: Feb. 1, 2018

(65) Prior Publication Data
US 2019/0283178 A1    Sep. 19, 2019

(30) Foreign Application Priority Data

Jul. 25, 2016  (FR) ........................ 1657138
Jul. 25, 2016  (FR) ........................ 1657139

(51) Int. Cl.
*B23K 26/0622*  (2014.01)
*B33Y 10/00*   (2015.01)
(Continued)

(52) U.S. Cl.
CPC ...... *B23K 26/0624* (2015.10); *B23K 26/0006* (2013.01); *B23K 26/0643* (2013.01);
(Continued)

(58) Field of Classification Search
CPC .. B23K 26/0624; B23K 26/359; B23K 26/53; B23K 26/0006; B23K 26/0643;
(Continued)

(56) References Cited

U.S. PATENT DOCUMENTS 11,186,060 B2 * 11/2021 Wieland ............ B23K 26/0604
2013/0056910 A1 * 3/2013 Houbertz-Krauss ................
                                                      B29C 64/386
                                                         264/401
(Continued)

FOREIGN PATENT DOCUMENTS

| EP | 2 476 505 A1 | 7/2012 | |
|----|--------------|--------|---|
| EP | 2476505 B1 * | 11/2016 | ......... B23K 26/0057 |
| WO | 2014/079478 A1 | 5/2014 | |

OTHER PUBLICATIONS

International Search Report, dated Oct. 12, 2017, from corresponding PCT/FR2017/052072 application.

*Primary Examiner* — Nathaniel E Wiehe
*Assistant Examiner* — Spencer H. Kirkwood
(74) *Attorney, Agent, or Firm* — NIXON & VANDERHYE

(57) ABSTRACT

Disclosed is a method for cutting dielectric or semiconducting material with a laser. The method includes the following steps: emission of a laser beam including at least one burst (Continued)

of N femtoseconds laser pulses; spatial separation of the laser beam into a first split beam having a first energy, and respectively, a second split beam having a second energy; spatial concentration of energy of the first split beam in a first zone of the material, respectively, of the second split beam in a second zone of the material, the first zone and the second zone being separate and staggered by a distance dx; and adjustment of the distance between the first zone and the second zone in such a way as to initiate a straight microfracture oriented between the first zone and the second zone.

8 Claims, 5 Drawing Sheets

(51) Int. Cl.
| | | |
|---|---|---|
| *B33Y 30/00* | (2015.01) | |
| *B23K 26/359* | (2014.01) | |
| *B23K 26/53* | (2014.01) | |
| *B23K 26/00* | (2014.01) | |
| *B23K 26/06* | (2014.01) | |
| *B23K 26/067* | (2006.01) | |
| *G02B 5/00* | (2006.01) | |
| *G02B 19/00* | (2006.01) | |
| *G02B 27/09* | (2006.01) | |
| *G02B 27/14* | (2006.01) | |
| *B23K 26/38* | (2014.01) | |
| *B23K 103/00* | (2006.01) | |

(52) U.S. Cl.
CPC ...... *B23K 26/0652* (2013.01); *B23K 26/0676* (2013.01); *B23K 26/359* (2015.10); *B23K 26/38* (2013.01); *B23K 26/53* (2015.10); *B33Y 10/00* (2014.12); *B33Y 30/00* (2014.12); *G02B 5/001* (2013.01); *G02B 19/0047* (2013.01); *G02B 27/0927* (2013.01); *G02B 27/14* (2013.01); *B23K 2103/50* (2018.08)

(58) Field of Classification Search
CPC ............ B23K 26/0652; B23K 26/0676; B23K 26/38; B23K 2103/50; B33Y 10/00; B33Y 30/00; B33Y 40/00; G02B 5/001; G02B 19/0047; G02B 27/0927; G02B 27/14; B81C 2201/0143; B41J 2/1635
See application file for complete search history.

(56) References Cited

U.S. PATENT DOCUMENTS

2015/0121960 A1    5/2015  Hosseini
2015/0158120 A1    6/2015  Courvoisier et al.
2018/0154572 A1*  6/2018  Richter ................ B23K 26/082

* cited by examiner

Fig.8A
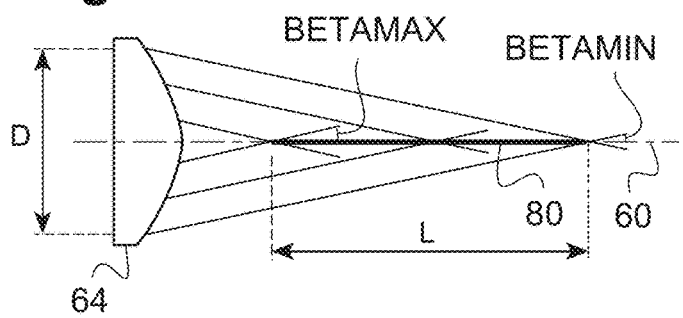
Fig.8B
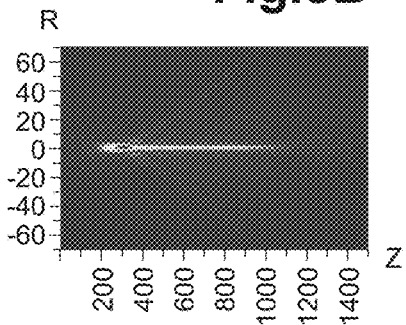
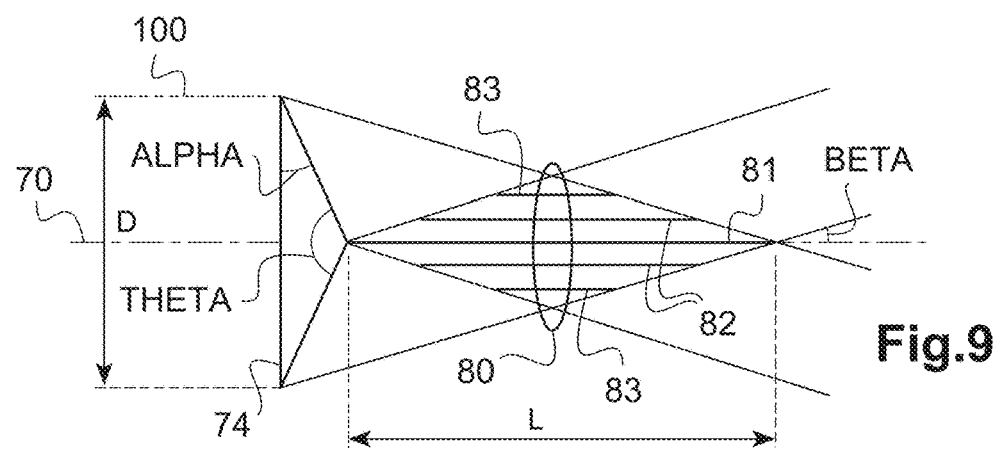
Fig.9
Fig.10A
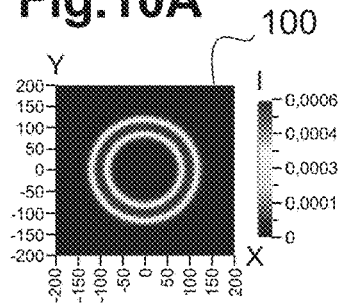
Fig.10B
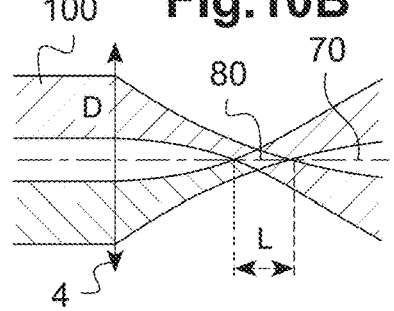
Fig.10C
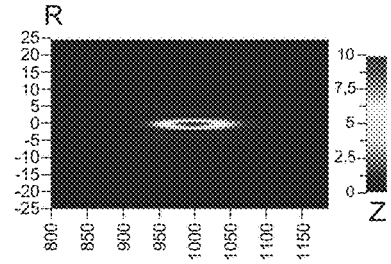
Fig.11
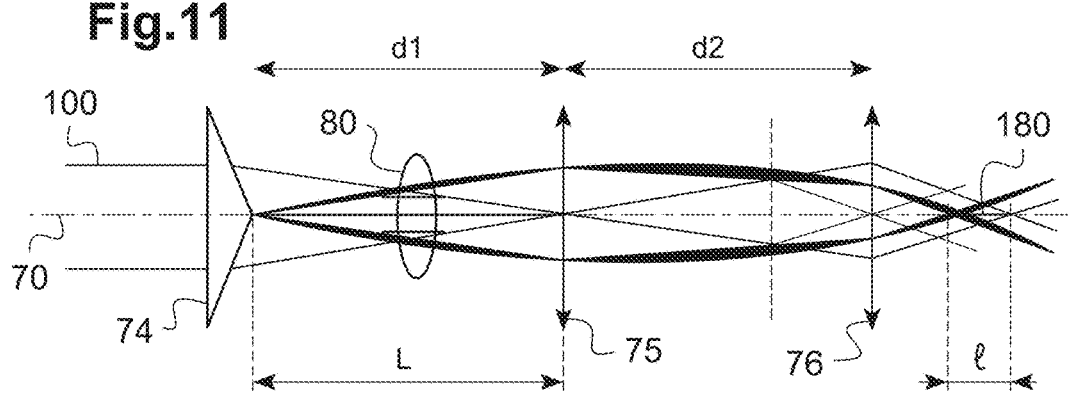

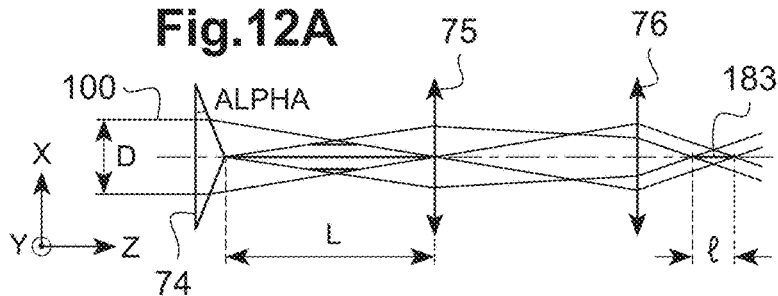
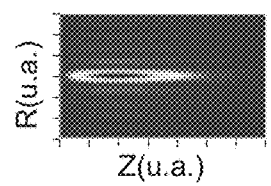
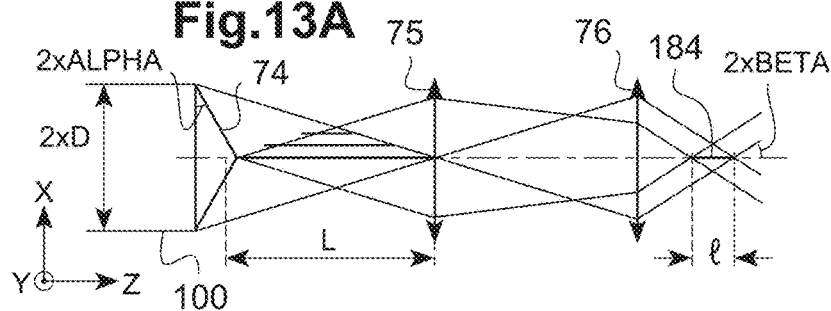
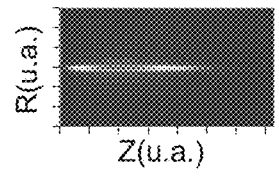
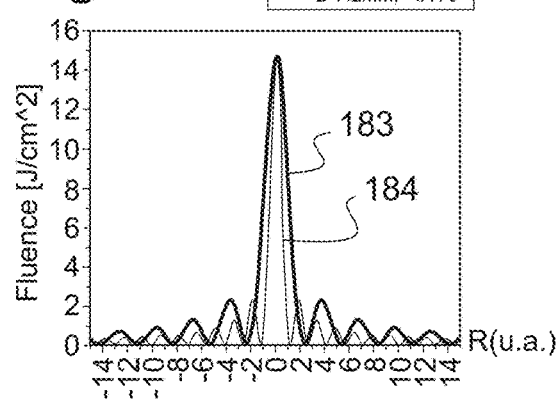
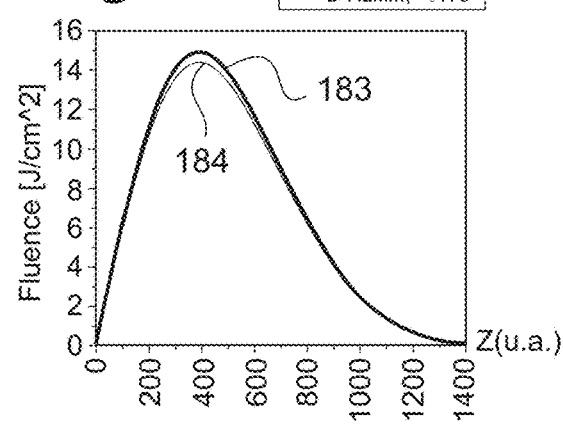
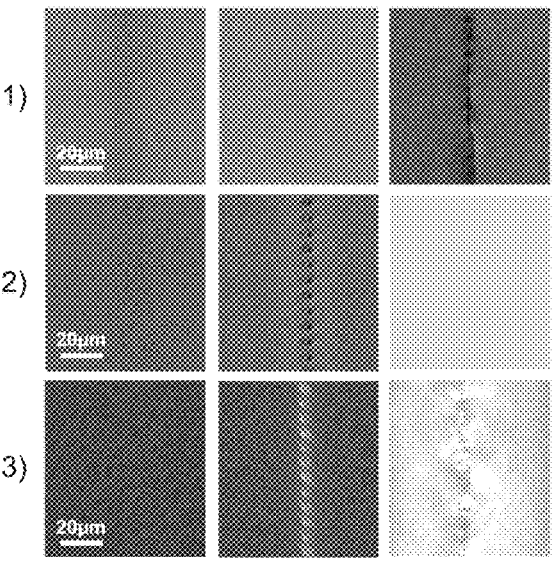

METHOD AND APPLIANCE FOR CUTTING MATERIALS BY MULTI-BEAM FEMTOSECOND LASER

TECHNICAL FIELD TO WHICH THE INVENTION RELATES

The present invention generally relates to the field of methods and devices for laser processing dielectric or semiconductor materials.

It more particularly relates to a method for cutting transparent dielectric or semiconductor materials, having a thickness comprised between a few tenths of millimetres and a few millimetres.

It relates in particular to a rapid cutting method, forming clean cut edges, without chipping and without loss of material.

TECHNOLOGICAL BACK-GROUND

The transparent dielectric inorganic materials such as, for example, glass, quartz or sapphire, or the semiconductor materials, such as silicon or germanium, are more and more used in flat panel displays of electronic devices, in optics, optoelectronics or also in watchmaking industry. The machining of these materials, and in particular the precision cutting, poses specific technical and industrial difficulties. The cutting technique must fulfil industrial requirements of high cutting speed, while minimizing the appearance of residual stresses in the material and while ensuring a good cutting quality, i.e. a clean cut edge, without chipping and without micro-crack initiation, so that post-processing steps such as polishing or precision grinding can be avoided.

Not only rectilinear but also curvilinear cuttings are desired, over variable lengths and thicknesses.

Different techniques for cutting transparent materials exist. The mechanical techniques are based on the use of a tool coated with diamond grains, for example a diamond saw, or a pre-cutting by means of a diamond or tempered steel roller before a separation of the parts obtained by application of a mechanical strength. Another cutting technique consists in applying a pressurized water jet of several thousands of bars, to erode the glass over its whole thickness, wherein the water can be filled with abrasive particles.

More recently, different techniques of laser cutting have been developed.

The laser cutting by fracture initiation consists in producing a notch in the surface of a cleavable material by laser ablation so as to initiate a fracture.

The fusion cutting of glass, sapphire or transparent ceramic is obtained by laser heating the material up to a fused state, then ejecting the fused material through the kerf by means of a pressurized gas (nitrogen or air). A laser emitting in the far infrared, such as, for example, a $CO_2$ laser, produces absorption and heating from the surface, the heat being diffused by conduction from the surface to the heart of the material. On the contrary, a laser emitting in the near infrared, for example a disc or fibre YAG laser, directly induces a volume absorption. The fusion cutting is generally made at a temperature far higher than the glass-transition temperature Tg at which the material has only a very low viscosity. This high temperature leads to thermally affect a wide area, which favours the appearance of micro-cracks and chipping along the cutting trajectory. For this reason, polishing or grinding post-processing steps are generally required after a fusion cutting.

The scribe and break method consists in producing a groove by laser ablation at the surface of the material to be cut, then applying a mechanical strength to separate both parts. The break occurs along the trajectory defined by the groove. The groove depth is of the order of 10 to 20 micrometres (μm). The cutting speed is important, at least 10 mm/s. However, this method generates ablation dust and deflections of the cutting plane may appear near the rear face.

Document EP 2476505_A1 describes laser processing method and system based on the splitting and focusing of an ultra-short pulse laser beam into two laser spots in contact with each other so as to form an elliptic spot in a material and to generate a fracture along the axis joining the two spots.

Document US2015/0158120 A1 describes a technique for boring materials of the semiconductor or glass type, comprising the emission of a first spatially-shaped laser pulse to generate a plasma channel in the material and the emission of a second electromagnetic wave, spatially superposed to the plasma channel, so as to heat the material and produce a boring.

The full laser ablation cutting by means of short or ultra-short pulses allows obtaining a spontaneous separation of the glass without any mechanical assistance. In the present document, it is understood by short pulses, pulses of duration comprised between 1 nanosecond (ns) and 1 microsecond (μs), and by ultra-short pulses, pulses of duration comprised between 10 femtoseconds (fs) and 1 nanosecond (ns).

The full laser ablation cutting technique is adaptable to different cutting trajectories and patterns: straight or curved lines, following a closed geometrical figure, small radius of curvature, chamfer. Due to the use of a transparent material, this method may be applied, by initiating the ablation by focusing to the upper surface on which the laser beam is incident, as it is the case for non-transparent materials, but also by initiating the ablation by focusing to the bottom surface and moving up to the upper surface ("bottom-up" technique). However, the full laser ablation cutting is a slower method for thick materials than the other methods mentioned hereinabove due to the fact that its leads to the removing of high quantity of material. Moreover, the cut edges produced by laser ablation are generally rough. Finally, this method generates a high quantity of dust and a wide notch in the material. Chipping may appear in certain conditions.

The laser cutting by controlled fracture propagation is based on the use of a YAG or a $CO_2$ laser to generate a notch in the edge of a glass plate, then applying a power laser beam while making a relative movement between the glass plate and the laser beam. The laser beam is absorbed in surface for a $CO_2$ laser or in volume for a YAG laser. The high temperature gradient generated by the laser beam is increased by a rapid cooling after the laser beam. This high thermal gradient induces a transient tensile stress that causes the initiation of a fracture from the initial notch. Then, this fracture will be propagated along the trajectory of the laser beam. The cut parts are released without mechanical assistance and exhibit an outstanding cutting quality for rectilinear trajectories: straight, smooth and defect-free edges. Despite these numerous advantages, the controlled fracture propagation suffers from drawbacks such as cutting uncertainty and inaccuracy due to cutting path deviations and a large amount of broken parts. Moreover, cutting tiny parts or curved trajectories with a small radius of curvature (<1 mm)

is almost impossible. Finally, the cutting speed is limited by the propagation of the fracture (several tens of mm/s).

There hence exists a need to develop a technique for cutting transparent dielectric inorganic or semiconductor materials, in particular glass, quartz or sapphire plates, which makes it possible to obtain a cut with sharp and smooth edges, along rectilinear trajectories, following a guiding line defining a planar cutting surface or following curved trajectories following a guiding line defining a cylindrical or conical cutting surface and with a high cutting speed.

OBJECT OF THE INVENTION

In order to remedy the above-mentioned drawback of the state of the art, the present invention proposes a method for laser cutting dielectric or semiconductor materials.

More particularly, it is proposed, according to the invention, a method comprising the following steps:

emitting a laser beam at a wavelength comprised in a spectral band of transparency of the material, the laser beam comprising at least one burst of N laser pulses, where N is a natural integer higher than or equal to 2, said laser pulses having a femtosecond duration, the N laser pulses of one burst being temporally separated from each other by a time interval comprised between a few hundreds of nanoseconds and one picosecond;

spatially splitting the laser beam into a first split beam having a first energy distributed along a first optical axis and, respectively, a second split beam having a second energy distributed along a second optical axis distinct from the first optical axis, the second optical axis being preferably parallel to the first optical axis, the first energy and the second energy being higher than a material modification threshold;

spatially concentrating the energy of the first split beam in a first area of the material and, respectively, that of the second split beam in a second area of the material, the first area and the second area being separated from each other and spaced apart by a distance dx, so as to produce localized modifications in the first area and in the second area; and adjusting the distance (dx) between the first area and the second area lower than a distance threshold, comprised between 1 micrometre and about ten micrometres so as to initiate a rectilinear micro-fracture oriented along a determined micro-fracturing direction extending between the first area and the second area.

Other non-limitative and advantageous characteristics of the method for laser cutting dielectric or semiconductor materials according to the invention, taken individually or according to any technically possible combination, are the following:

the pulses have a duration comprised between 10 and 900 femtoseconds, the number N of femtosecond pulses in said burst being lower than or equal to 20, said laser source having a rate comprised between 1 kHz et 1 GHz, the wavelength of the laser beam is comprised between 250 nm and 2.2 µm, the first energy and the second energy are lower than 1 mJ and higher than 1 nJ;

the laser beam emitted by the laser source having Gaussian spatial distribution, the first split beam and the second split beam are spatially shaped so as to each have a Bessel beam spatial distribution;

the Bessel beam spatial distribution of the first split beam is transversally and/or longitudinally modified along the optical axis of the first split beam in the first area and/or, respectively, the Bessel beam spatial distribution of the second split beam is transversally and/or longitudinally modified along the optical axis of the second split beam in the second area;

the step of spatially splitting the laser beam is adapted to generate a plurality of M spatially-split beams, the M split beams being preferably parallel to the axis Z and the M split beams defining a portion of cutting surface, where M is a natural integer higher than or equal to three, the plurality of M spatially-split beams having a lateral offset relative to each other, taken two-by-two, and wherein the step of spatial concentration of energy comprises spatially concentrating the energy of the plurality of M split beams in a plurality of M separated areas of the material, the M separated areas being arranged on a surface generated by a guiding line, said surface being planar, cylindrical or conical, each split beam having an energy higher than a material modification threshold, so as to initiate a plurality of localized modifications in the plurality of M separated areas of the material; and adjusting the distance (dx) between any two areas among the plurality of M separated areas lower than a distance threshold, comprised between 1 micrometre and about ten micrometres, so as to initiate an oriented rectilinear micro-fracture, this micro-fracture being oriented along a micro-fracturing direction extending between said any two areas among the plurality of M separated areas;

the method further comprises a step of relative displacement between said split beams and the material.

Advantageously, the method further comprises an additional step of applying another laser beam, laterally offset by a distance lower than one millimetre with respect to said micro-fracture, this other laser beam having an energy lower than the material ablation threshold so as to cause a thermal stress without additional micro-fracturing of the dielectric or semiconductor material.

The invention also proposes an appliance for laser cutting dielectric or semiconductor materials, comprising a laser source adapted to emit a laser beam at a wavelength comprised in a spectral band of transparency of the material.

More particularly, it is proposed, according to the invention, an appliance in which the laser source is adapted to emit said laser beam comprising at least one burst of N laser pulses, where N is a natural integer higher than or equal to 2, said laser pulses having a femtosecond duration, the N laser pulses of one burst being temporally separated from each other by a time interval comprised between a few hundreds of nanoseconds and one picosecond, and the appliance further including an optical spatial-splitting device arranged so as to receive the laser beam and to generate a first split beam along a first optical axis and at least one second split beam along a second optical axis, distinct from the first optical axis, the second optical axis being preferably parallel to the first optical axis, the first split beam having a first energy and, respectively, the second split beam having a second energy, the first energy and the second energy being adapted to allow, separately from each other, the initiation of non-controlled micro-cracks, and an optical spatial-energy-concentration device arranged so as to spatially concentrate the first energy of the first split beam in a first area of the material and, respectively, the second energy of the second split beam in a second area of the material, the first area and the second area being separated from each other and spaced apart by a distance dx; the distance (dx) between the optical axis of the first beam in the first area and the optical axis of the second beam in the second area being lower than a distance threshold, the distance threshold being lower than a few tens of micrometres, so as to initiate an oriented rectilinear micro-fracture, this micro-fracture being oriented along a determined micro-fracturing direction extending between the first area and the second area.

Other non-limitative and advantageous characteristics of the appliance for laser cutting dielectric or semiconductor materials according to the invention, taken individually or according to any technically possible combination, are the following:

the first split beam has a transverse spatial extent equal to D in the first area, the second split beam has a transverse spatial extent equal to D in the second area, where D is lower than or equal to 2 micrometres and where the distance dx is higher than or equal to 1 micrometre and lower than or equal to about ten micrometres;

the device further comprises a system for relative displacement between, on the one hand, the solid material and, on the other hand, the first split beam and the second split beam;

the laser source is configured to deliver pulses having a duration comprised between 10 and 900 femtoseconds, at a wavelength comprised between 250 nm and 2.2 μm and at a rate of 1 kHz to 10 GHz and, preferably 1 GHz to 10 Ghz, where the number N of femtosecond pulses in said burst is lower than or equal to 20;

the optical spatial-energy-concentration device is configured to generate a plurality of focusing points of the first split beam along the first optical axis in the first area and, respectively, another plurality of focusing points of the second split beam along the second optical axis in the second area;

the optical spatial-splitting device and/or the optical spatial-energy-concentration device are configured so as to generate a Bessel beam spatial intensity distribution along the first optical axis and, respectively, along the second optical axis;

the optical spatial-splitting device and/or the optical spatial-energy-concentration device comprise a spatial phase and/or amplitude modulator or a phase and/or amplitude mask configured to modify a spatial intensity distribution of the first split beam transversally to the first optical axis in the first area and, respectively, to modify a spatial intensity distribution of the second split beam transversally to the second optical axis in the second area;

the optical spatial-energy-concentration device comprises another phase and/or amplitude mask configured to modify a spatial intensity distribution of the first split beam along the optical axis of the first split beam in the first area and, respectively, to modify a spatial intensity distribution of the second split beam along the optical axis of the second split beam in the second area;

the dielectric material is chosen among a glass having a thickness comprised between 100 micrometres and a few millimetres, the laser wavelength is comprised between 250 nm and 2.2 μm, the first energy and the second energy are lower than 1 mJ and higher than 1 nJ.

DETAILED DESCRIPTION OF AN EXEMPLARY EMBODIMENT

The following description in relation with the appended drawings, given by way of non-limitative examples, will allow a good understanding of what the invention consists in and how it can be implemented.

In the appended drawings:

FIG. 1 shows a block diagram of the method for cutting dielectric or semiconductor materials using multiple laser beams according to an exemplary embodiment;

FIG. 2 schematically shows the selection of pulses for generation in single femtosecond laser pulse mode (FIG. 2A) and in femtosecond pulse burst (FIG. 2B);

FIG. 3A schematically shows a laser configured to generate an impact creating micro-cracks in a sample;

FIG. 3B schematically shows the transverse spatial intensity distribution in the interaction area of the laser beam and an example of generated micro-fractures;

FIG. 4A schematically shows a laser configured to split a laser beam into two simultaneous beams; FIG. 4B shows the transverse spatial intensity distribution in the interaction area of the two laser beams and the generation of an oriented micro-fracture;

FIG. 5 schematically shows a cutting appliance using multiple femtosecond laser beams according to one embodiment;

FIG. 8 illustrates the use of a multi-focal optical system to focus a laser beam to a plurality of dots;

FIG. 9 illustrates an example of axicon optical system generating a beam having a Bessel transverse spatial distribution;

FIG. 10 illustrates the use of an annular beam to generate a beam having a Bessel transverse spatial distribution;

FIG. 11 illustrates an example of combination of an axicon and an optical system to modify a Bessel spatial distribution;

FIG. 12 illustrates an example using an axicon having an apex angle ALPHA and a beam of diameter D;

FIG. 13 illustrates another example using another axicon having an apex angle 2*ALPHA and a beam of diameter 2*D;

FIG. 14 illustrates the control of the transverse spatial location of the energy deposited;

FIG. 15 illustrates an example of microscopy images of traces made at the surface of a sodiocalcic glass by different types of laser beams with spatial shaping and/or in burst pulse mode;

Figure 16:
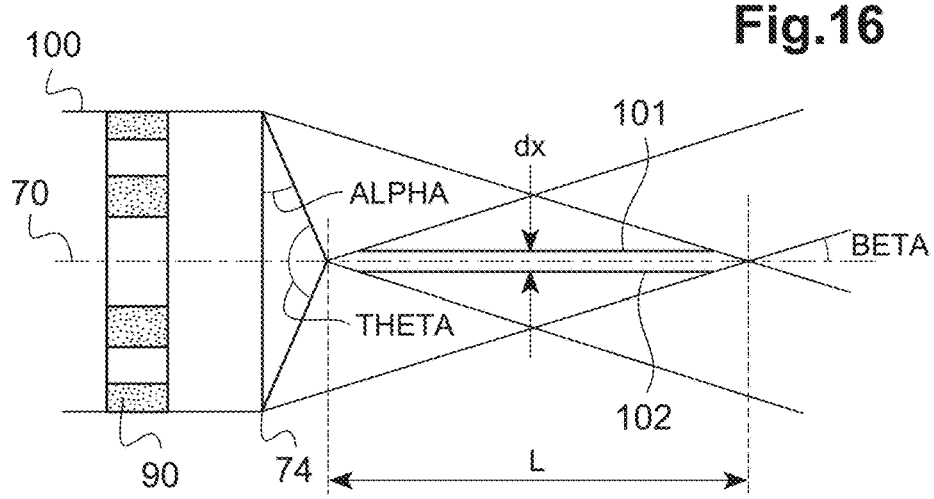

FIG. 16 schematically shows another embodiment combining an optical system and a phase mask for generating a double Bessel beam;

FIG. 17 illustrates an example of phase mask for spatially splitting a Bessel beam;

FIG. 18 illustrates another example of phase mask for spatially splitting a Bessel beam.

METHOD AND APPLIANCE

In the present application and in the figures, the same reference signs denote identical or similar elements.

Figure 1:
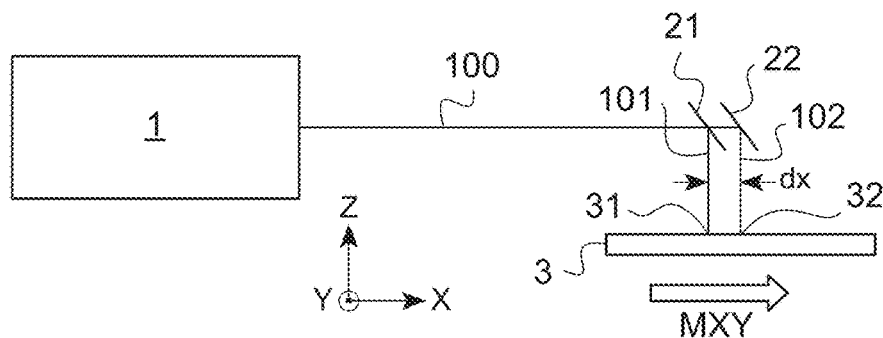

FIG. 1 shows a block diagram of a spatial aspect of the method for cutting dielectric or semiconductor material using multiple laser beams.

A sample 3 is arranged on a sample-holder. The sample 3 is made of a transparent dielectric material, for example tempered or not glass, or of a semiconductor material. The sample 3 is in the form of a plate having a generally uniform thickness, comprised between a few tenths of millimetres and a few millimetres, and preferably between 100 microns and one millimetre.

The system comprises a laser source 1 generating a beam 100 comprising femtosecond pulses, as described in relation with FIG. 1. More precisely, the laser source 1 generates a laser beam 100 consisted of femtosecond pulses, i.e. of pulses of duration lower than 1 picosecond. The rate of the laser 1 defines the duration between two pulses. The rate of the laser source 1 is generally comprised between 1 kHz and 10 MHz. Consequently, the duration between two pulses emitted successively varies between about 1 millisecond (ms) and 10 microseconds (μs). The laser source generates a laser beam 100 having a high power, generally comprised between 0.5 W and 500 W.

A splitting plate 21, for example a semi-transparent plate, splits the beam 100 into a first laser beam 101 and a second laser beam 102. A mirror 22 reflects the second laser beam 102 along an optical axis parallel to and located at a distance dx from the optical axis of the first laser beam 101. This system allows applying simultaneously the first laser beam 101 in a first interaction area 31 of the sample and the second laser beam 102 in a second interaction area 32 of the sample. By way of example, the sample-holder is mounted mobile in translation on a stage, so as to allow the sample 3 to be displaced with respect to the laser beams 101, 102, which are fixed.

The spacing, denoted dx, between the optical axis of the first beam 101 in the first area 31 and the optical axis of the second beam 102 in the second area 32 of the sample is adjusted with a sub-micrometric accuracy.

The appliance of FIG. 1 is easily generalizable to the generation of a multi-beam comprising more than two beams. For that purpose, the one skilled in the art will easily replace the splitting plate 21 by a plurality of splitting plates arranged in series on the optical path of the laser beam so as to generate a plurality of laser beams spatially separated from each other. Advantageously, each split beam is separated from another adjacent split beam by a same spacing dx. This system makes it possible to multiply the number of femtosecond laser beams applied simultaneously to adjacent areas of the sample. This system is particularly adapted for rectilinear cuttings along a guiding line defining a planar cutting surface. For curvilinear cuttings along a guiding line defining a cylindrical or conical cutting surface, a laser beam split into two beams may be used. Particularly advantageously, the orientation of the split beams is combined with a relative movement between the sample to be cut and the cutting appliance to generate a cut along the desired trajectory in the plane XY. A radius of curvature of the cutting surface comprised between about 1 mm and the infinite is hence obtained. As an alternative, the multi-beams are, by construction, distributed over a predetermined portion of curve, which allows reaching a radius of curvature of the cutting surface comprised between 1 mm and the infinite.

FIG. 1 also shows the orientation of the spacing dx between two simultaneous pulses with respect to a direction of relative displacement MXY between the sample 3 and the laser beams 101 and 102. The adjustment of the position and orientation of the splitting plate 21 and/or, respectively, of the mirror 22, makes it possible to adjust the position of the first interaction area 31 and the angle of incidence of the first beam 101 on the sample 3 and/or, respectively, the position of the second interaction area 32 and the angle of incidence of the second beam 102 on the sample 3. Advantageously, the optical axis of the second beam 102 is parallel to the optical axis of the first beam 101. The direction of the displacement MXY applied between the emission of successive pulses is for example parallel to the spacing dx between the first laser beam 101 and the second laser beam 102 or not. The displacement being made in the plane XY. In a variant, an angle is introduced between the optical axis of the beam and the axis normal to the surface of the sample 3 in the plane XY and the displacement applied between the emission of successive pulses is adapted to produce a slightly conical cutting surface having an apex angle lower than or equal to 10 degrees with respect to the surface of the sample 3. A slightly conical cutting surface allows an easy and generally spontaneous dissociation of the cut part with respect of the material plate.

In particular conditions of pulse duration and spatial spacing dx between the two impacted areas, this system surprisingly makes it possible to generate an oriented micro-fracture, this micro-fracture being oriented along a predetermined direction extending between the first area 31 and the second area 32 of the sample. Moreover, this configuration offers the advantage not to generate material ablation or microbubbles in the material. The so-obtained cutting surface has a surface roughness comprised between 0.2 μm and 5 μm. Consequently, the cutting method allows avoiding additional steps of polishing or precision grinding.

It ensues from the present disclosure that the adjustment of the spacing dx between two adjacent areas impacted by the same initial split beam is hence critical for the generation of an oriented rectilinear micro-fracture 45, this micro-fracture 45 being oriented along a predetermined direction extending between these two adjacent areas.

FIG. 2 shows a temporal aspect of the method for cutting dielectric or semiconductor materials using multiples laser beams according to the present disclosure.

Figure 2A:
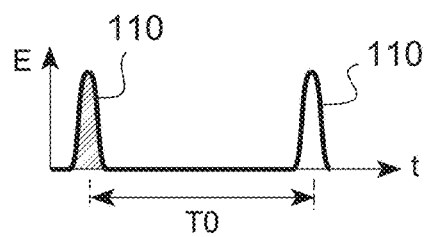

FIG. 2 illustrates a particular aspect of the present disclosure. FIG. 2A shows the energy of a sequence of femtosecond laser pulses 110 selected and amplified in single-pulse mode as a function of time. In this single-pulse mode, the time interval T0 between two successive pulses 110 is selected, by means of a pulse selector (or pulse picker) so that these pulses can be amplified in an optical amplifier system. The time interval T0 is linked to the rate, or repetition frequency (frep), of the laser by the relation frep=1/T0. Generally, frep can vary from a few hundreds of kHz up a few units of MHz. The repetition frequency is generally very lower than the frequency (fosc) of the injector of the laser source 1.

Figure 2B:
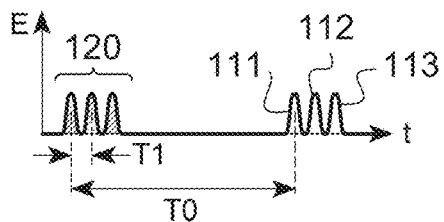

Particularly advantageously, a sequence of femtosecond pulses, usually called burst mode, illustrated in FIG. 2B, is used. FIG. 2B schematically shows a burst consisted of three femtosecond pulses 111, 112, 113. As known otherwise, the pulse selector of the laser source 1 may be configured to select a burst 120 of femtosecond pulses 111, 112, 113. The total energy Ep of the femtosecond pulses 111, 112, 113 of a pulse burst 120 is herein equal to the energy of an amplified single-pulse 110 at the repetition frequency. The pulse rate of a burst is for example defined by the rate (fosc=1/Tosc) of the laser source used. Generally, fosc is fixed by the injector of the laser system (for example, of the order of 40 MHz in the example of FIG. 2B). An important data element is the number of pulses in the burst (called "PBB"). The spacing T1 between two pulses of a burst may vary from 900 nanoseconds to 1 picosecond. The spacing values cannot be obtained by a specific configuration of the laser source 1, but can be obtained by optical devices using birefringent crystals, otherwise known, which are external to the laser source 1.

According to the present disclosure, the burst mode is combined with the beam spatial splitting to generate an oriented rectilinear micro-fracture, this micro-fracture extending between two interaction areas distant from each other by dx. The combination of the spatial splitting of the laser beam and of the temporal splitting of a femtosecond pulse into a burst of femtosecond pulses has for effect to maximize the localization of the energy deposition made by the femtosecond pulses. The use of femtosecond pulses allows obtaining a maximum of absorption of the energy available in the material. However, the femtosecond pulses induce a less spatially localized absorption than a picosecond pulse. Nevertheless, the use of a burst allows a relocalization of the energy deposited. This concentration of the deposited energy allows a micro-fracturing and, thereafter, a direct cutting of the material. Moreover, the spatial splitting and temporal splitting make it possible to control the generation of non-linear optical effects in the material.

Figure 3A:
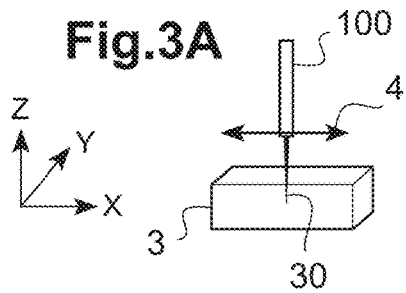
Figure 3B:
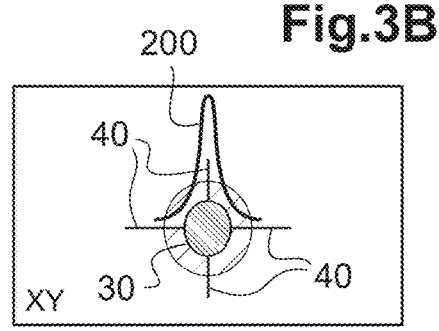

FIG. 3 illustrates the effect of a single femtosecond laser beam 100 applied directly to the sample, i.e. without spatial splitting of the beam. FIG. 3A shows the laser beam 100 directed along an optical axis aligned with the axis Z of an orthonormal reference system XYZ. The lens 4 focuses the laser beam 100 in an area 30 of the sample 3. The laser beam 100 has an energy adjusted so as to allow the generation of micro-fractures. FIG. 3B schematically shows the spatial intensity distribution in the plane XY and in the interaction area 30 of the laser beam 100. The intensity distribution of the laser beam 100 is herein supposed to have a symmetry of revolution about the optical axis. The curve of intensity 200 along the axis X has for example a distribution of the Gaussian type. In the plane XY, the intensity is schematically represented by concentric rings centred to the interaction area 30. The absorption of the laser beam 100 in the sample generates micro-fractures 40, for example herein 4 in number, which are radially oriented from the optical axis Z of the laser beam and may be randomly oriented about the axis Z. It is generally very difficult to orient in a predetermined manner of the direction of the micro-fractures 40.

Figure 4A:
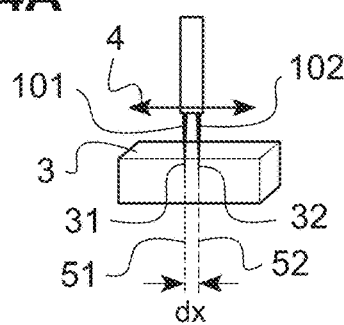

FIG. 4 illustrates the effect of the first laser beam 101 and of the second laser beam 102 applied simultaneously on the sample. FIG. 4A shows the first femtosecond laser beam 101 directed along an optical axis parallel to the axis Z and the second femtosecond laser beam 102 directed along another optical axis parallel to the axis Z of the orthonormal reference system XYZ. The lens 4 focuses the first laser beam 101 in a first area 31 and the second laser beam 102 in a second area 32 of the sample 3. The first area 31 and the second area 32 are laterally separated from each other by a spacing dx. The curve of intensity 201 of the first beam in the first area 31 as a function of the axis X and, respectively, the curve of intensity 202 of the second beam in the second area 32 as a function of the axis X, are shown. The area 31 is separated from the area 32. In other words, there is no spatial overlapping between the first femtosecond laser beam 101 and the second laser beam 102 in the focusing area inside the sample. Surprisingly, it is observed that the absorption of the first laser beam 101 and of the second laser beam 102 generally produces at least one oriented micro-fracture 45 between the first area 31 and the second area 32.

Without being bound by the theory, the use of a double beam, or, more generally a multi-beam, makes it possible to control the stresses induced in the material, and hence to orient the micro-crack or micro-fracture.

On the one hand, the spacing dx is adjusted to be large enough so that the conditions of absorption of a beam are not too modified by the absorption of the adjacent beam. In the other hand, dx must not be too large in order for an effect of orientation of the fracture initiation to be efficient. By way of non-limitative example, a spacing dx is chosen between 1 µm and 10 µm, for sizes of the areas 31 and 32 each lower than 2 µm.

Figure 4B:
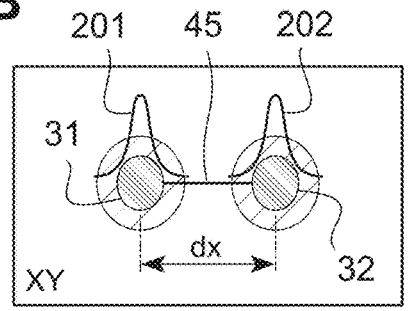

On the other hand, the sum of the energy of the first laser beam 101 and of the energy of the second laser beam 102 is herein equal to the energy of the laser beam 100 of FIG. 3. FIG. 4B schematically shows the spatial intensity distribution of the laser beams 101, 102 in the plane XY and in the interaction areas 31, 32.

The oriented micro-fracture 45 is generated at an energy that is lower than the energy required for a significant internal modification of the material. For each material to be cut, there exists an optimum energetic domain, depending of each material. This domain is inferiorly limited in energy by the material modification threshold. This threshold is lower than the threshold of damages that are optically viewable, to the naked eye or using an optical microscope (fusion, creation of bubbles, also called voids). On the other hand, this lower energy threshold can be viewed using instruments such as a polarizing or phase-contrast microscope. The upper limit of the energy domain is fixed by the threshold of damages which are optically viewable, to the naked eye or using an optical microscope.

Figure 5:
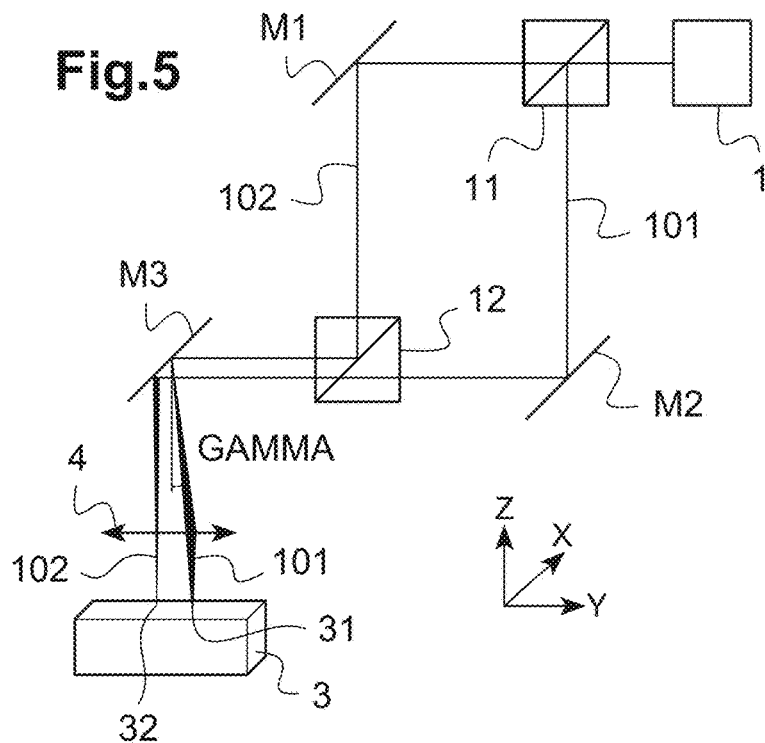

FIG. 5 schematically shows an example of appliance for laser cutting transparent materials according to another embodiment.

The cutting appliance comprises: a laser source 1, an optical system comprising mirrors M1, M2, M3, a beam splitter 11, another beam splitter 12 and a focusing lens 4.

The laser source 1 generates a laser beam 100 consisted of femtosecond pulses, such as described in relation with FIG. 1.

By way of non-limitative example, the laser beam 100 coming from the source 1 is linearly polarized. A planar mirror 10 reflects the laser beam 100 towards a beam splitter 11. The beam splitter 11 spatially splits the laser beam 100 into a first beam 101 directed along a first optical axis and a second beam 102 directed along a second optical axis. Preferably, at the exit of the beam splitter 11, the energy of the first beam 101 is equal to the energy of the second beam 102. A mirror M1 and, respectively, M2, reflects the first beam 101 and, respectively, the second beam 102, towards another beam separator 12. The beam separator 12 recombines the first beam 101 and the second beam 102 while maintaining an angular offset, denoted GAMMA, between the first optical axis and the second optical axis. A mirror M3 reflects the first beam 101 and the second beam 102 towards an optical system 4, for example a microscope lens. The optical system 4 focuses the first beam 101 in a first area 31 of the sample 3 and, simultaneously, the second beam 102 in a second area 32 of the sample 3.

The system of FIG. 5 hence generates two femtosecond pulses that are delivered simultaneously on the first area 31 and on the second area 32 of the sample 3. The first area 31 and the second area 32 are spatially separated from each other. Preferably, the areas 31 and 32 have a shape that is comparable to a disk whose diameter is lower than 2 µm in a plane transverse to the optical axis.

The orientation of the mirror M1 and/or of the mirror M2 allows adjusting the position of the first area 31 with respect to the position of the second area 32, by means of the angle gamma.

The system of FIG. 5 is configured so as to allow an accurate sub-micron adjustment of the spacing, denoted dx, between the optical axis of the first beam 101 in the first area 31 and the optical axis of the second beam 102 in the second area 32 of the sample.

Figure 6A:
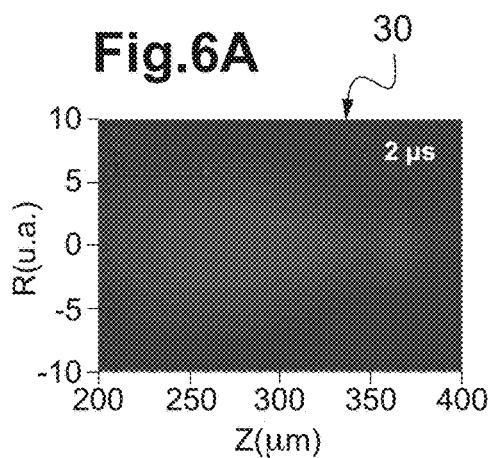
FIG. 6A shows the effect induced in the material by a single femtosecond laser pulse and FIG. 6B shows the effect of a burst of pulses, the burst of pulses having the same total energy as the single pulse used in FIG. 6A.

FIG. 6A shows a mapping of the temperature induced by a single-pulse femtosecond laser beam along the optical axis (Z) of the beam into the material (in abscissa), and as a function of the radial distance R (in ordinates) with respect to this axis Z. In FIG. 6A, the laser beam has an energy of 1 µJ, a rate of 500 kHz and a time interval of 2 µs.

Figure 6B:
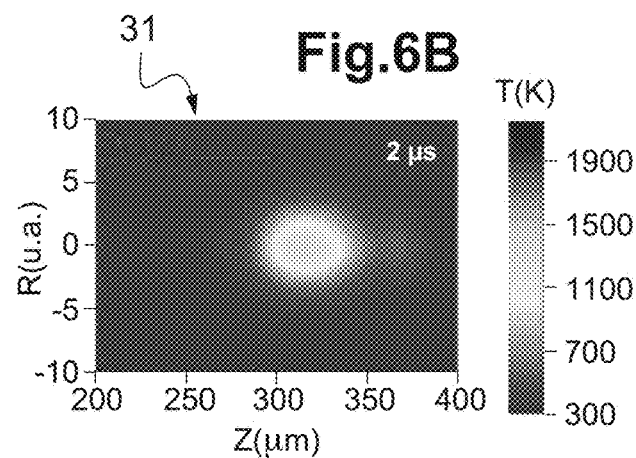

FIG. 6B shows a mapping of the increase of temperature induced by a laser beam in burst mode, comprising five femtosecond pulses, along the optical axis (Z) in abscissa, and as a function of the radial distance R (in ordinates) with respect to this axis Z. In FIG. 6B, the laser beam has a total energy of 1 µJ, a duration T1 of about 25 ns between two pulses, a rate of 500 kHz or a time interval of 2 µs between two pulse bursts. It is observed in FIG. 6B a stronger localization of the energy deposited by a burst of five pulses compared to FIG. 6A corresponding to the energy deposited by an amplified single-femtosecond pulse of same total energy. FIG. 6A-6B illustrate complex effects according to which the burst mode temporally distributes the intensity of a pulse 110 into several pulses 111, 112, 113 of lower intensity, which allows reducing the non-linear effects while spatially concentrating the energy deposition on a smaller cylindrical volume (diameter ~2 microns) than a single pulse.

Figure 7:
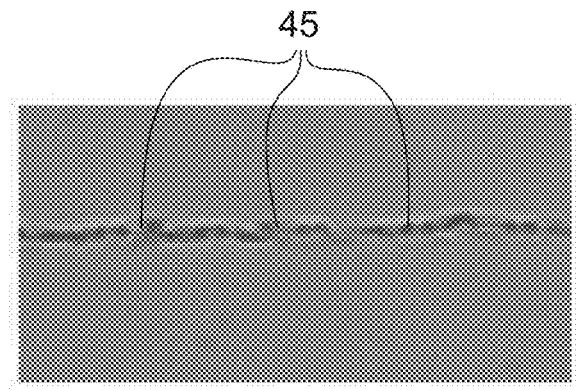
FIG. 7 illustrates an example of initiation of oriented fractures produced by means of the method and the appliance of the present disclosure.

FIG. 7 is an optical microscopy image showing an example of trace obtained at the surface of a sodiocalcic glass plate by means of a system as described in relation with FIG. 1. The laser source has a Gaussian distribution of energy. The system generates a double laser beam and the spacing between the split beams is dx=3.6 µm. In this example, the total energy of the laser beam is of 2.5 microjoules (µJ). The pulses are generated in burst mode, a pulse burst containing 4 femtosecond pulses, separated by 25 ns. The speed of linear displacement is of 90 mm/s and the laser rate is of 5 kHz, the distance d between two double impacts is then d=18 µm. In FIG. 7 is observed an alignment of the initiation of the rectilinear micro-fractures 45 produced in the direction of the linear displacement along the axis X.

The method of the present disclosure is operational at high laser rate (>200 kHz), which allows increasing the cutting speed up to several metres per second, because it is not penalized by a phenomenon of heat accumulation in the material. For that purpose, the laser beams are displaced with respect to the sample so as to avoid the spatial overlapping between two consecutive pulses (or bursts), to obtain a cutting speed of the order of 100 mm/s at 10 kHz, 1 m/s at 100 kHz or 10 m/s at 1 MHz.

FIG. 8 illustrates a particular aspect of an embodiment of the present disclosure used in combination with the spatial beam splitting and the burst mode. According to this particular aspect, an optical focusing system 64 is used, which is configured to have a plurality of focal points on the longitudinal optical axis 60. For that purpose, the optical focusing system 64 uses for example an aspheric lens, having a greater radius of curvature on the optical axis 60 than on the edges. The optical focusing system 64 receives a laser beam 101 and generates a plurality of focal points on an area 80 extended longitudinally along the optical axis 60. Such an optical focusing system 64 allows adapting the focusing area of the laser beam as a function of the thickness of the material which is liable to exceed one millimetre, for example 2 mm.

FIGS. 9 to 18 illustrate another particular aspect of an embodiment of the present disclosure used in combination with the spatial beam splitting and the burst mode. According to this other particular aspect, an optical device, configured to generate a beam having a Bessel beam intensity distribution transversally to the longitudinal optical axis of the laser beam.

In a first exemplary embodiment, illustrated in FIG. 9, an optical element 74 called axicon is used to form a Bessel beam. The axicon has an angle ALPHA and an apex angle THETA. The apex of the axicon 74 is arranged on the optical axis of a laser beam 100 having a Gaussian distribution. The axicon hence forms a Bessel beam 80 comprising, in a transverse plane of the optical axis 70, a central area 81 of maximum intensity, and several concentric rings 82, 83 of decreasing intensity as a function of the radial distance to the optical axis 70. This Bessel beam extends over a length L along the optical axis 70.

In another exemplary embodiment, illustrated in FIG. 10B, an annular laser beam 10 is formed. A conventional lens-based optical system 4 receives the annular laser beam 100 and forms, by optical interferences, a beam of the Bessel-Gauss type (said "Bessel") of length L near the optical axis. FIG. 10A shows the intensity distribution of the annular laser beam 100 in a plane transverse to the optical axis upstream from the lens 4. FIG. 10C shows the intensity distribution of the Bessel beam 80 in the focusing area as a function of the distance along the optical axis, in abscissa, and as a function of the radial distance to the optical axis, in ordinates. It can be observed in FIG. 10C a spatial distribution of energy that is extended longitudinally but concentrated transversally to the optical axis 70. The central fringe of the Bessel beam may be intense enough to produce by non-linear absorption an internal modification in a dielectric material transparent to the radiation. The so-produced modification is elongated and of circular symmetry.

According to another exemplary embodiment, illustrated in FIG. 11, the length of a Besse beam is adjusted by combining an axicon 74 and a lens-based optical system 75, 76 forming a telescope. The axicon 74 forms a Bessel beam 80 of length L. The lens-based optical system 75, 76 forms an image 180 of the Bessel beam of length l along the optical axis 70. Such an optical device is simple and allows optimizing the length of the Bessel beam and hence the volume in which the energy is deposited. In practice, the Bessel beam 80 is produced in the air and the Bessel beam 180 is projected into the thickness of the material, for example glass, by the telescope 75, 76 of magnification lower than 1; which allows reducing the length l and to increase the intensity of the Bessel beam 180. The so-obtained length l of the Bessel beam 180 is adjustable from 0.2 to 2.0 mm by modifying the apex angle of the axicon 74 and the magnification of the telescope formed by the lenses 75, 76. The Bessel beam 180 allows obtaining an elongated intra-volume modification to affect uniformly the glass over its whole thickness.

FIG. 12A illustrates an example of a Bessel beam forming optical device. In this example, the axicon presents an acute angle ALPHA. The lens 75 has a focal length f1 and the objective 76 a focal length f2. In this example, the lens 75 is arranged at a distance d1 from the axicon, such that d1≈L. The objective 76 has a focal length f2 and is arranged at distance d2 from the lens 75 such that d2≈f1+f2. The length l of the so-imaged Bessel beam 180 is equal to l=L/M, where M is the magnification factor, herein M=f1/f2. For f2=200 mm and an objective ×20 with f2=10 mm, a length l=0.9 mm is obtained in the mass of a material having a refractive index n=1.5 (or 0.6 mm in the air). The diameter of the incident beam is noted D. The angle with which the radiations generated by the device cross the optical axis is noted BETA.

FIG. 12B illustrates the spatial intensity distribution of the imaged beam 180 obtained by means of the device of FIG. 12A as a function of the distance along the axis Z, in abscissa, and, respectively, as a function of the radial distance R with respect to the optical axis 70, in ordinates.

FIG. 13A illustrates another example of Bessel beam forming optical device, wherein the angles of the axicon have been modified to adjust the length of the imaged Bessel beam. In this example, the axicon presents an angle equal to 2*ALPHA. The diameter of the incident beam is herein of 2*D. An angle BETA is hence obtained, which has a value comprised between a value BETA MIN and another value BETA MAX. Similarly to FIG. 12B, FIG. 13B illustrates the intensity distribution of the imaged beam 180 obtained with the device of FIG. 13A as a function of the distance along the axis Z, in abscissa, and, respectively, as a function of the radial distance R with respect to the optical axis 70, in ordinates. It can be observed in FIG. 13B a spatial distribution that is more concentrated transversally to the optical axis, compared to FIG. 12B.

In the simulation examples illustrated in FIGS. 12B and 13B, the femtosecond pulse has an energy of 10 μJ, and the focal lengths are f1=200 mm, f2=10 mm. In the case of the device of FIG. 12A: ALPHA=1 degree, D=3.6 mm. In the case of FIG. 13A-13B: ALPHA=2 degrees, D=7.2 mm.

FIG. 14 gives a representation in sectional view of the images presented in FIGS. 12B and 13B, for visualizing the transverse amplitudes in FIG. 14A (or radially along the axis X define in FIG. 14) and, respectively, the longitudinal amplitudes in FIG. 14B (along axis Z) of the energy density F (in $J/cm^2$) deposited by the femtosecond pulse burst.

The Bessel beam 184 obtained in FIG. 13B appears radially narrower with respect to the optical axis compared to the Bessel beam 183 obtained in FIG. 12B. On the other hand, the longitudinal extent and the energy density of the two beams seam similar in FIG. 14B.

FIG. 15 shows different microscopy images obtained in different conditions of beam shaping.

In all the cases viewed in FIG. 15, the femtosecond pulses (pulse duration between 200 and 800 fs) have an energy of 60 μJ and the same material is used (sodiocalcic glass). The speed of relative displacement with respect to the sample and the laser rate lead to a spacing of 10 μm between two successive pulses. The three visualization techniques shown in FIG. 15 correspond respectively to:

Line 1): a conventional optical microscope. This technique allows visualizing the cracks, the defects and the coloured centres of the material.

Line 2): a phase-contrast microscope. This technique allows visualizing the modifications of the material associated with a modification of the refractive index (not visible with an optical microscope).

Line 3): a crossed-polarisation microscope. This technique allows visualizing the distribution of the stresses induced around the modified areas.

Different exemplary embodiments are visualized:

Column a): Standard Bessel beam. This beam is obtained according to the device illustrated in FIG. 9, with an angle BETA=6.7°.

Column b): Standard Bessel beam in burst mode, with 4 pulses per burst, each pulse in a burst being separated from another pulse of the same burst by a time interval of 25 ns.

Column c): Narrow Bessel beam, obtained according to the device illustrated in FIG. 13, with an angle BETA=13°, and in a burst mode identical to the case b).

In the cases a) and b), the optical microscope shows very few observable modifications, only the case c) lets appear micro-cracks, the energy localization is hence sufficient in this case. The phase-contrast microscope reveals that the case a) has neither generated a modification of index in the material. On the other hand, the use of the burst mode makes it possible to sufficiently localize the energy to obtain strong variations of index. In the case c), the presence of fractures scatters the light and prevents from obtaining a sharp image. The cross-polarization microscope neither reveals modifications in the case a), confirms in the case b) the presence of stresses locally induced around the areas affected by the beam, and of wider areas around the fractures induced in the case c).

The optimum adjustment of the spatial splitting of the beam, of the burst mode and of the Bessel beam spatial shaping hence makes it possible to define the conditions of an energy deposition allowing the initiation of fractures, while minimizing the induced stress area.

FIG. 16 illustrates another embodiment of a spatial splitting device. This device uses an active or passive diffractive optical element 90, and an axicon 74. The diffractive optical element 90 allows generating directly at least two or several spots. The diffractive optical element 90 comprises, for example, a phase mask making it possible to obtain the spatial splitting of the laser beam 100. The diffractive optical element 90 is placed upstream from the axicon 74. The axicon 74 makes it possible to generate a Bessel beam. The system of FIG. 16 hence allows generating two Bessel beams 101, 102 separated from each other by a spacing dx and extending parallel to each other. Advantageously, the phase mask is placed on a rotary stage that allows the phase mask to be automatically oriented as a function of a predetermined cutting trajectory. The orientation of the phase mask 90 makes it possible to modify the orientation of the split beams 101, 102 and hence to determine the orientation of the micro-fractures in the material. The micro-cracks are hence aligned in the desired cutting direction. This active device allows cutting, along curved trajectories (with a radius of curvature comprised between 1 mm and the infinite), both amorphous and crystalline or birefringent materials.

Figure 17A:
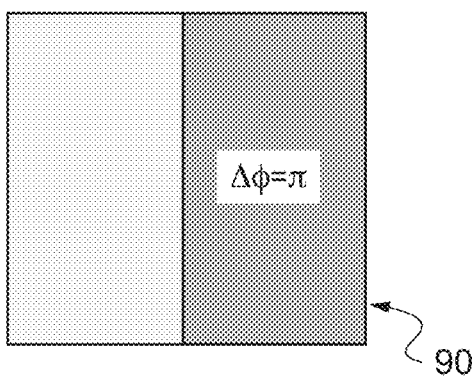
Figure 17B:
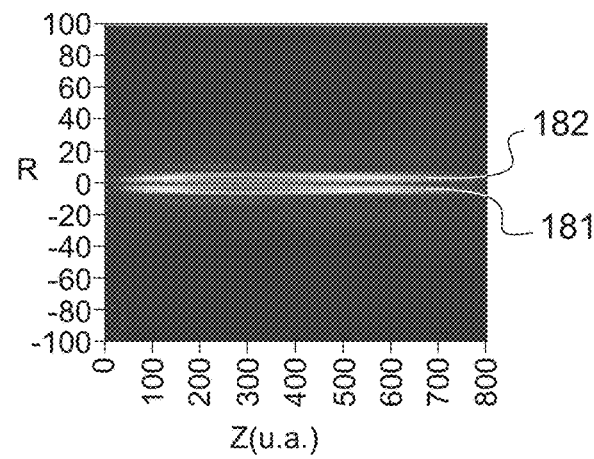

An example of phase mask 90 is illustrated in FIG. 17 in front view. This phase mask 90 is split into two parts. For example, the phase mask includes one half having a uniform phase equal to 0 and another half having a uniform phase equal to π. The line separating the two parts of the phase mask is arranged transversally to the optical axis 70 of the laser beam 100. The FIG. 17B illustrates the intensity distribution of the two beams 181, 182 obtained with a device as that of FIG. 16 and the phase mask of FIG. 17A, as a function of the axis Z, in abscissa, and, respectively, as a function of the radial distance R with respect to the optical axis 70, in ordinates.

Figure 18A:
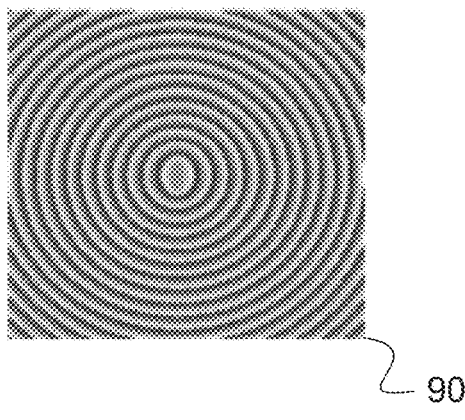
Figure 18B:
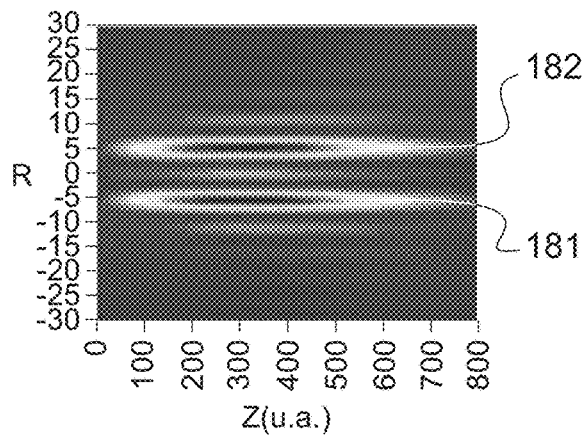

Another example of diffractive optical element 90 is illustrated in FIG. 18 in front view. This diffractive optical element 90 may be made by means of a passive phase mask or an active element of the spatial light modulator (SLM) type. FIG. 18B illustrates the intensity distribution of the two beams 181, 182 obtained with a device as that of FIG. 16 and the phase mask of FIG. 18A, as a function of the optical axis Z, in abscissa, and, respectively, as a function of the radial distance R with respect to the optical axis 70, in ordinates.

The method allows generating micro-fractures arranged one after each other while being tangent to the desired cutting line. Generally, the separation is spontaneous. In the case where the separation is not immediate or spontaneous, a variant of the method consists in applying another laser beam laterally offset with respect to the micro-fractures on the side of the part which is not desired to be kept, over a distance lower than one millimetre with respect to the cutting trajectory. This other laser beam has different laser characteristics so as to bring a slight thermal stress without micro-fracturing nor additional cutting of the material. For that purpose, the other laser beam has an energy lower than the ablation threshold, in single-pulse mode and not in burst mode, and can operate at a higher rate. This additional step allows a contactless separation of the cut part from the plate of dielectric or semiconductor material.

The method of the present disclosure applies in particular to the cutting of transparent, amorphous or crystalline mineral dielectric materials, such as chemically tempered glass, standard glass or sapphire, or to the cutting of semiconductor materials, for example silicon or germanium. By transparent, it is meant transparent to the laser wavelength. By mineral, it is meant non-organic and non-metallic. The material to be cut may be reinforced/tempered (with pre-stresses or variable stress profile on the thickness) or normal (without pre-stress). The following materials may be mentioned in non-exhaustive and non-limitative way:

- tempered sodiocalcic glass used in applications of mobile phone or electronic tablet screen protection (for example, Gorilla glass from Coring, Dragon Trail from Asahi Glass or Xensation from Schott) or high-resolution flat display screens. Several Gorilla nuances exist as a function of the chemical tempering thickness (DOL, for Depth of Layer, of 30 to 50 µm), the glass thickness and its mechanical strength and scratch resistance;
- reinforced borosilicate glass (Eagle from Corning), or erosion-thinned tempered glass;
- tempered sodiocalcic glass for household appliances (Flat Glass from Schott, of thickness higher than 1 mm);
- sodiocalcic glass for application in the building and architecture fields;
- borosilicate glass for ophthalmologic optical glasses;
- melted silica, quartz, fluorinated glasses for UV optical glasses;
- chalcogenide glass for mean IR optical glasses;
- sapphire used as a LED substrate, protective glass for CCD sensor in smart-electronics, protective glass for moving parts or casings in watchmaking,
- multi-layer laminated glass, comprising a plastic or adhesive film taken between two layers of glass.

More particularly, the invention finds applications in:

- curvilinear cutting of tempered sodiocalcic glass used as a protective glass for the portable electronic devices with or without a touch-screen (mobile phone, smart phone, electronic tablet);
- linear cutting of tempered sodiocalcic glass for high-resolution flat display screens (TV, display, computer);
- curvilinear cutting of tempered glass used as a protective glass in the military ground display systems;
- curvilinear cutting of protective glass or sapphire for CCD sensors used in optoelectronics or electronics, for example the protective glass of a portable phone photo/video lens;
- curvilinear cutting of optical components made of borosilicate glass or melted silica;
- cutting of ultrathin glass of 30 to 40 µm thick;
- cutting of glass tube for medical applications;
- singulation of sapphire used as a substrate for the blue LEDs in optoelectronics;
- cutting of doped or non-doped YAG crystal, or of diamond, for photonic components.

The invention claimed is:

1. A method for laser cutting dielectric or semiconductor materials, wherein said method comprises the following steps:
    emitting in single-pulse mode at a rate, a laser beam (100) at a wavelength comprised in a spectral band of transparency of the material comprised between 250 nm and 2.2 µm, the laser beam (100) comprising successive bursts of N laser pulses, where N is a natural integer higher than or equal to 2 and lower than or equal to 20, said laser pulses having a duration comprised between 10 and 900 femtoseconds, the N laser pulses of one burst being temporally separated from each other by a time interval defined by a pulse rate of 1 GHz to 10 Ghz and a repetition rate of the successive bursts of N laser pulses being comprised between 1 kHz and 10 MHz;
    spatially splitting the laser beam (100) into a first split beam (101) having a first energy distributed along a first optical axis and, respectively, a second split beam (102) having a second energy distributed along a second optical axis distinct from the first optical axis, the first energy and the second energy are lower than 1 mJ and higher than 1 nJ, the first energy and the second energy being higher than a material modification threshold, and wherein an upper limit of the energy domain is fixed by the threshold of damages which are optically viewable, to the naked eye or using an optical microscope;
    spatially concentrating the energy of the first split beam (101) in a first area (31) of the material and, simultaneously, that of the second split beam (102) in a second area (32) of the material, the first area (31) and the second area (32) being separated from each other and spaced apart by a distance dx, so as to produce localized modifications in the first area (31) and in the second area (32) without generating material ablation or microbubbles in the material; and
    adjusting the distance (dx) between the first area (31) and the second area (32), the distance (dx) being comprised between 1 micrometre and about ten micrometres so as to initiate an oriented rectilinear micro-fracture (45), this micro-fracture (45) being oriented along a predetermined direction extending between the first area (31) and the second area (32).

2. The method according to claim 1, wherein the laser beam (100) emitted by the laser source having Gaussian spatial distribution, the first split beam (181) and the second split beam (182) are spatially shaped so as to each have a Bessel beam spatial distribution.

3. The method according to claim 2, wherein the Bessel beam spatial distribution of the first split beam (181) is transversally and/or longitudinally modified along the optical axis of the first split beam in the first area (31) and/or, respectively, the Bessel beam spatial distribution of the second split beam (182) is transversally and/or longitudinally modified along the optical axis of the second split beam in the second area (32).

4. The method according to claim 2, wherein the step of spatially splitting the laser beam is adapted to generate a plurality of M spatially-split beams, where M is a natural integer higher than or equal to three, the plurality of M spatially-split beams having a lateral offset relative to each other, taken two-by-two, and wherein the step of spatial concentration of energy comprises spatially concentrating the energy of the plurality of M split beams in a plurality of M separated areas of the material, each split beam having an energy higher than a material modification threshold, and wherein an upper limit of the energy domain is fixed by the threshold of damages which are optically viewable, to the naked eye or using an optical microscope so as to produce a plurality of localized modifications in the plurality of M separated areas of the material without generating material ablation or microbubbles in the material; and adjusting the distance between any two areas among the plurality of M separated areas, the distance (dx) being comprised between 1 micrometre and about ten micrometres, so as to initiate an oriented rectilinear microfracture between said any two areas among the plurality of M separated areas.

5. The method according to claim 3, wherein the step of spatially splitting the laser beam is adapted to generate a plurality of M spatially-split beams, where M is a natural integer higher than or equal to three, the plurality of M spatially-split beams having a lateral offset relative to each other, taken two-by-two, and wherein the step of spatial concentration of energy comprises spatially concentrating the energy of the plurality of M split beams in a plurality of M separated areas of the material, each split beam having an energy higher than a material modification threshold, and wherein an upper limit of the energy domain is fixed by the threshold of damages which are optically viewable, to the naked eye or using an optical microscope so as to produce a plurality of localized modifications in the plurality of M separated areas of the material without generating material ablation or microbubbles in the material; and adjusting the distance between any two areas among the plurality of M separated areas, the distance (dx) being comprised between 1 micrometre and about ten micrometres, so as to initiate an oriented rectilinear micro-fracture between said any two areas among the plurality of M separated areas.

6. The method according to claim 1, wherein the step of spatially splitting the laser beam (100) is adapted to generate a plurality of M spatially-split beams, where M is a natural integer higher than or equal to three, the plurality of M spatially-split beams having a lateral offset relative to each other, taken two-by-two, and wherein the step of spatial concentration of energy comprises spatially concentrating the energy of the plurality of M split beams in a plurality of M separated areas of the material, each split beam having an energy higher than a material modification threshold, and wherein an upper limit of the energy domain is fixed by the threshold of damages which are optically viewable, to the naked eye or using an optical microscope so as to produce a plurality of localized modifications in the plurality of M separated areas of the material without generating material ablation or microbubbles in the material; and adjusting the distance (dx) between any two areas among the plurality of M areas, the distance (dx) being between 1 micrometre and about ten micrometres, so as to initiate an oriented rectilinear micro-fracture (45) between said any two areas among the plurality of M separated areas.

7. The method according to claim 1, further comprising a step of relative displacement between said split beams and the material.

8. The method according to claim 1, further comprising an additional step of applying another laser beam, laterally offset by a distance lower than one millimetre with respect to said micro-fracture, this other laser beam having an energy lower than the material ablation threshold so as to cause a thermal stress without additional micro-fracturing of dielectric or semiconductor material.

\* \* \* \* \*